Patented Nov. 4, 1941

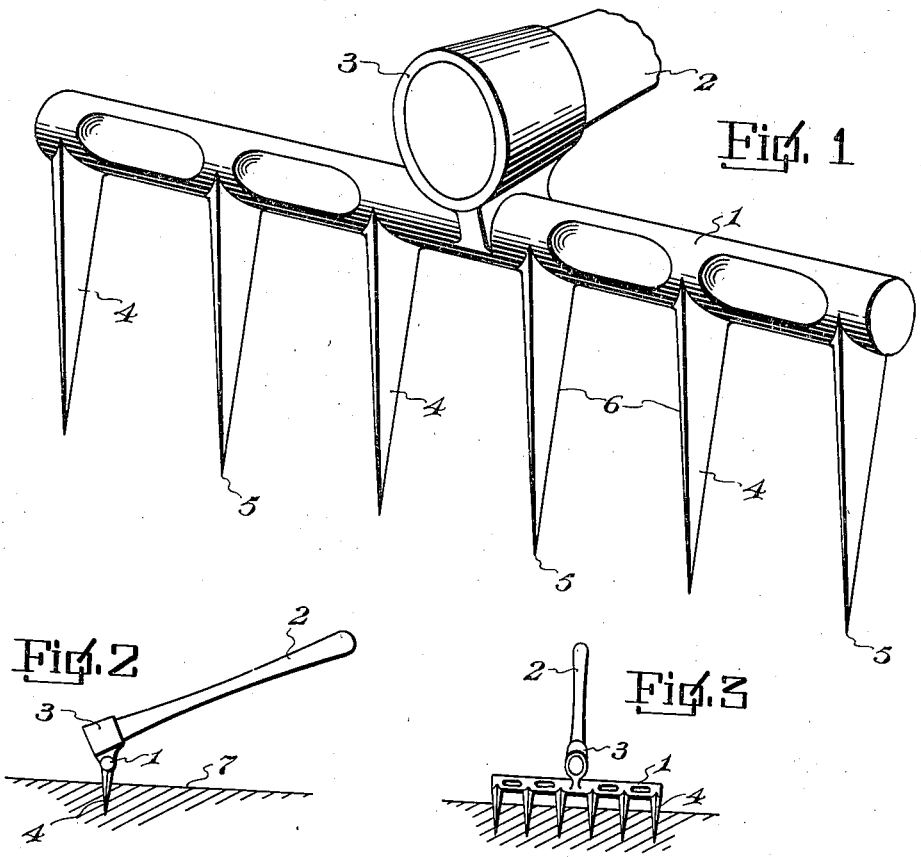

2,261,722

UNITED STATES PATENT OFFICE 2,261,722

LAWN SPIKING TOOL

James R. Ervine, Tulsa, Okla.

Application May 24, 1940, Serial No. 337,073

1 Claim. (Cl. 47—1)

The invention relates to lawn spiking tools of the character used in forming holes in lawns and the like so fertilizer and water will enter the ground adjacent the roots of the grass, and has for its object to provide a device of this character having piercing tines so shaped that their adjacent edges are sharp, thereby preventing packing of the soil between the tines so moisture will easily enter the soil.

A further object is to form the tines so they are diamond shaped in cross section, and the greatest dimension side edges of said tines are in the same transverse plane, thereby preventing packing of the soil between the tines when the tines are forced into the ground, and allowing the tool to be easily removed from the ground without dislodging soil between the tines and marring the lawn.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the lawn spiking tool.

Figure 2 is a side elevation of the tool showing the tines embedded in the ground.

Figure 3 is a front elevation of the tool.

Figure 4 is a horizontal sectional view through the tines and a portion of the ground.

Referring to the drawing 1 designates the head of the spiker which is transversely disposed in relation to the handle 2 and is connected to the handle by a socket 3. It will be noted, by referring to Figure 2, that the handle 2 is at an obtuse angle to the plane of the tapered spiker tines 4, and that when the operator is in a standing position the lawn may be spiked at a right angle to the surface thereon without a prying action of the tines in the ground as they are withdrawn from the soil, therefore it will be seen the lawn will not be mutilated.

The tines 4 are in the same transverse plane and taper from the head 1 to their sharpened points 5 so that when they are forced into the ground the soil will not be packed downwardly, hence moisture and fertilizer will easily enter the ground when placed in the holes. In devices of this character, it has been found, where the tines are round or have their flat sides in adjacent relation, the soil packs between the tines when the holes are formed, and when the tines are withdrawn from the ground soil is dislodged and the lawn marred. To overcome this objection the tapered tines 4 are diamond shaped in cross section and have their adjacent sharpened edges 6 in the same transverse plane, and it will be seen the limited packing action is outwardly in the direction of the arrows $a$, hence there is no packing of soil between the tines and the soil will not be marred or pulled out in chunks when the tines are removed for the next spiking operation.

From the above it will be seen that a lawn spiking tool is provided which is simple in construction and one wherein the tines are so shaped that soil will not be packed between the same when the tines are forced into the lawn, therefore will not pull out chunks of soil when the spiker is removed.

The invention having been set forth what is claimed as new and useful is:

A lawn spiking tool comprising a tine head, a handle member for said head, a plurality of downwardly extending ground piercing tines carried by said head and in the same plane, said tines having their lower ends sharpened and tapering from the head to the sharpened ends, said tines being adjacent each other, said tines being diamond shaped in horizontal cross section, thereby forming sharpened edges at opposite sides of their greatest dimension, said sharpened edges being in the same plane on all the tines and forming means whereby the ground is split by the tines when they are forced into the ground and the earth is forced outwardly from the tines thereby preventing packing of the earth between the tines.

JAMES R. ERVINE.